Aug. 19, 1952   J. O. HENDRICKS   2,607,711
ADHESIVE TAPES AND LINERS HAVING LOW-ADHESION COATINGS
Filed Oct. 27, 1949

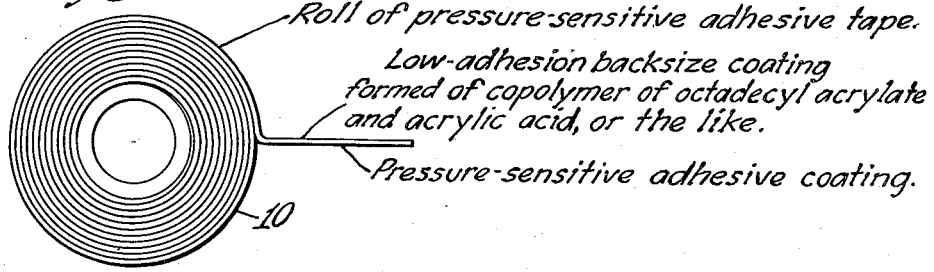

Fig. 1
Roll of pressure-sensitive adhesive tape.
Low-adhesion backsize coating formed of copolymer of octadecyl acrylate and acrylic acid, or the like.
Pressure-sensitive adhesive coating.

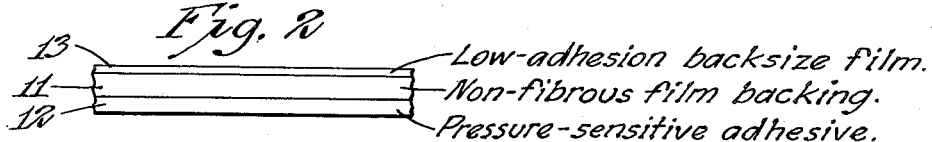

Fig. 2
Low-adhesion backsize film.
Non-fibrous film backing.
Pressure-sensitive adhesive.

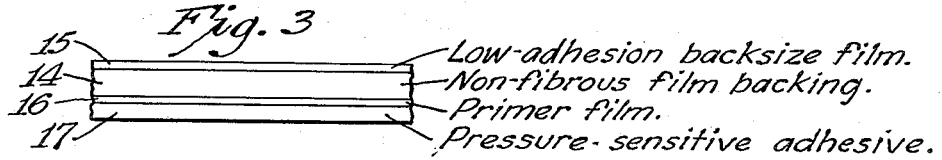

Fig. 3
Low-adhesion backsize film.
Non-fibrous film backing.
Primer film.
Pressure-sensitive adhesive.

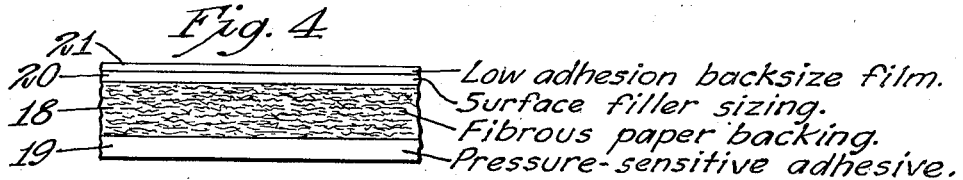

Fig. 4
Low adhesion backsize film.
Surface filler sizing.
Fibrous paper backing.
Pressure-sensitive adhesive.

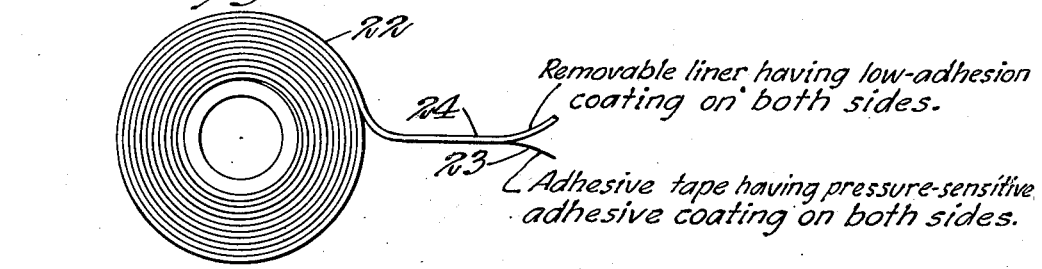

Fig. 5
Removable liner having low-adhesion coating on both sides.
Adhesive tape having pressure-sensitive adhesive coating on both sides.

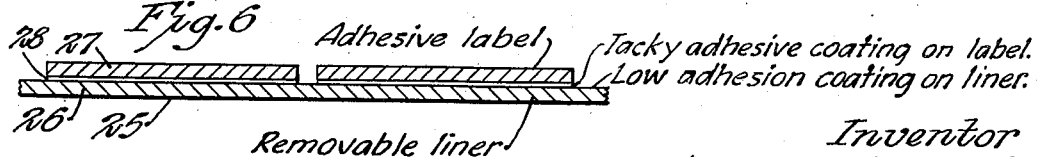

Fig. 6
Adhesive label. Tacky adhesive coating on label.
Low adhesion coating on liner.
Removable liner.

Inventor
James O. Hendricks
By Carpenter Abbott Coulter & Kinney
Attorneys

Patented Aug. 19, 1952

2,607,711

UNITED STATES PATENT OFFICE 2,607,711

ADHESIVE TAPES AND LINERS HAVING LOW-ADHESION COATINGS

James O. Hendricks, White Bear Lake, Minn., assignor to Minnesota Mining & Manufacturing Company, St. Paul, Minn., a corporation of Delaware Application October 27, 1949, Serial No. 123,908

13 Claims. (Cl. 117—122)

This invention relates to my discovery of an effective low-adhesion backsize coating for aggressively tacky, pressure-sensitive adhesive tape, which permits the tape to be unwound from the roll with much less effort. The invention provides improved pressure-sensitive adhesive tapes characterized by being backsized with the novel low-adhesion coating. The invention also provides improved liners for adherent rubber surfaces generally.

I have discovered that low-adhesion coatings having the combination of properties hereafter specified can be formed from the high-polymers made by copolymerizing a higher-alkyl acrylate or higher-alkyl methacrylate monomer ester with acrylic acid or methacrylic acid, both components being present in substantial proportion. By "higher-alkyl" is meant a long chain alkyl radical, having a length of at least 12 carbon atoms.

The compositional structure of these copolymers is indicated by the following formula, wherein R represents a higher-alkyl radical having a length of at least 12 carbon atoms, and R' and R'' represent hydrogen or methyl radicals:

The above formula shows in the upper part an ester unit (E) provided by the higher-alkyl acrylate (when R' is H) or higher-alkyl methacrylate (when R' is CH₃); and in the lower part an acid unit (A) provided by the acrylic acid (when R'' is H) or methacrylic acid (when R'' is CH₃). There are a large number of such ester and acid components forming the units of a high-polymer linear chain molecule. The two types of component units do not alternate in simple fashion throughout the copolymer molecule, being randomly distributed. A 1:1 type of copolymer is formed when the ester and acid units of the copolymer are present in equal percent by weight. Other ratios can be used as hereinafter explained.

The higher-alkyl radical (R) of the ester component provides a long linear-type side chain having a length of at least 12 carbon atoms, which may be visualized as extending off to the right in the above formula.

A particular, preferred, example of a copolymer of the above kind is made by copolymerizing octadecyl acrylate (CH₂:CHCOOC₁₈H₃₇) with acrylic acid (CH₂:CHCOOH) to provide a weight ratio of about 3:2. The ratio of the number of ester to acid units is about 1:3. Thus the acid component predominates on a unit or mole basis, although being in minor proportion on a weight basis (and also on a volume basis). This copolymer is represented by the following formula showing adjacent units of the ester (E) and acid (A) types:

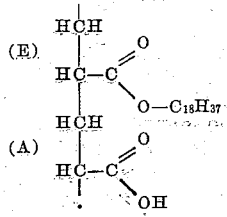

This ester-acid copolymer is distinctly different in physical properties and in activity toward contacting adhesives, from the homopolymer formed from the ester per se, and from the homopolymer formed from the acid per se. The latter are not effective, either alone or mixed together, for providing the desired low-adhesion types of coatings. Copolymerization of the monomeric starting compounds is essential in order to obtain a polymer having the required properties. The effect is not additive but is combinative, resulting in a new entity having new properties and highly useful in the present connection.

The ester-acid copolymers employed in this invention are soluble in ethyl acetate and in toluene, but are insoluble in alkane solvents, such as heptane. They are water-insoluble and coatings thereof are water-repellent (hydrophobic). They are clear, hard, rather brittle, non-tacky, glassy materials at room temperature, when the acid component is in the proportion of 30% by weight or more. When lower proportions of acid are present the bulk polymer is an opaque, brittle, wax-like material, but thin films are highly transparent and clear. They are thermoplastic and at sufficiently elevated temperatures they become soft and rubbery, and finally tacky at still higher temperatures.

The softening point (at which the copolymer becomes rubbery) increases with increase in length of the higher-alkyl side chain, and is affected in major degree by the ester:acid ratio. In the case of the octadecyl acrylate copolymer, mentioned above, increase in the acrylic acid ratio raises the softening point to a value of approximately 212° F. at a 3:2 ratio (i. e., 40 weight percent acrylic acid), as contrasted to the softening point of the octadecyl acrylate homopolymer, which is about 120° F. The homopolymer is an opaque, white, waxy material, which is very brittle. The acrylic acid component also serves to decrease the brittleness and increase the flexibility of the copolymer, and makes it clear and glassy when the proportion is 30% or more.

The higher-alkyl side chains provided by the ester component of the copolymer must have a length of at least 12 carbon atoms. Chains of shorter length fail to provide the desired low-adhesion property and the desired physical properties. A chain length of 16 to 20 carbon atoms is preferred for all-around good performance in relation to all types of pressure-sensitive tape adhesives. Still longer chains would be useful but the required acrylate esters, and copolymers made therefrom, are too costly and difficult to prepare to make them attractive from the practical, commercial standpoint, at the present time.

A very important contribution of the acrylic acid component is that it enables the copolymer to be coated upon non-fibrous cellulosic films, having lustrous, dense, non-porous surfaces, to form very tightly adherent surface films, despite the low-adhesion characteristic of the outer, exposed surface of the coating in respect to pressure-sensitive adhesive surfaces thereafter brought into contact. The ester homopolymers lack this property.

However, the acrylic acid component introduces an undesirable effect if the proportion is unduly increased. Too high a ratio prevents the copolymer from having the low-adhesion characteristic which is essential to its utility for adhesive tape backsizes.

The general useful range of proportions is confined by the various pertinent considerations to about 40 to 80% of the ester component (60 to 20% of the acid component) by weight. The preferred ester proportion is 40 to 70%.

The optimum proportions also depend upon the composition of the pressure-sensitive adhesive. A further factor is the behavior of the low-adhesion coating when in contact with the tape adhesive for extended periods of time, and at temperatures above normal room temperature. In the case of copolymer made from octadecyl acrylate and acrylic acid, it has been found as the result of much experimentation, that the most desirable ratio, all things considered, is about 3:2 (i. e., 60% ester component and 40% acid component in the copolymer).

The acrylic (or methacrylic) acid component can be replaced in part by another copolymerizable ethylenic monomer such as, for example, acrylonitrile or methacrylonitrile. However, it is considered preferable not to do so as it has been found in general that this tends to decrease the desirable properties of the copolymer in one or more respects for usage as a low-adhesion backsize.

A very desirable feature of the present copolymer material is that it can be coated either from a solution in a volatile organic solvent or from an aqueous dispersion. The latter is advantageous as costs are lowered and fire hazards are avoided.

This type of copolymer (whether of the glassy or waxy kind) can be coated on cellulosic films to provide tightly bonded surface films of microscopic thinness, which are highly colorless and transparent. These extremely thin coating films have properties different from the bulk properties of the material, due to orientation of molecules and to the extremely high ratio of surface area to the third dimension of thickness. These films are very flexible, despite the fact that the bulk polymer is a brittle, glassy or waxy, solid.

Cellophane sheeting can readily be coated by squeeze roll procedure with a solution having a 5 to 10% solids content of the copolymer to result (after drying) in a continuous copolymer coating having a weight of about one pound per 2,000 square yards, and a thickness of the order of $10^{-5}$ in. (i. e. a hundred-thousandth of an inch). Even thinner coatings can be employed. When coated with pressure-sensitive tape adhesive on the reverse (face) side, and slit and wound into rolls, an adhesive tape product results which can be unwound with much less effort, even after long standing and even when the tape roll has been subjected to higher than normal temperatures (such as may be encountered during warehouse storage or shipment, in very hot weather, or by being stored near hot steam radiators or pipes). These are very important points.

The effectiveness of a proposed low-adhesion coating cannot be judged merely on the basis of initial performance at room temperature of a recently made roll of tape. Many types of coatings provide a very low initial adhesion but entirely lose this property after a few days or weeks of contact with the pressure-sensitive adhesive, and may even increase the force required to unwind the tape. Others, while satisfactory at normal room temperature, fail when subjected to elevated temperatures such as are encountered in trade usage. Many types of coatings cause progressive loss of tack of the pressure-sensitive adhesive so that the tape becomes substandard or even worthless in a relatively short period. Some coatings develop an affinity for the contacting adhesive to the point where they are stripped off when the tape is unwound, thereby masking the adhesive surface of the unwound tape, or produce this result in any event, in consequence of inadequate anchorage to the substrate on which coated. I have discovered that the present low-adhesion coatings do not suffer from these defects.

In respect to pressure-sensitive adhesive tapes backsized with the low-adhesion coatings of my invention, it has been found that the unwind effort increases somewhat during the first two weeks after winding in roll form, and then levels off at a stable value. Measured after two weeks, film-backed tapes utilizing the preferred copolymer backsizing (octadecyl acrylate:acrylic acid in 3:2 ratio), require an unwind force which is only 0.5 to 0.7 as great as in the case of an untreated cellophane backing, the value depending upon the particular type of adhesive. Even when heated to 150° F. for 16 hours it was found that the unwind force ratio remains less than 0.8 and in some cases considerably less. The proportional reduction in relative unwind force depends somewhat upon the particular adhesive employed in making the comparison. In any given case it is substantially independent of the rate of unwind until a high unwind value is reached at which the low-adhesion coating "lets go" of the adhesive and the tape can then be unwound with even less effort. This last feature is an advantage when tape is unwound at high speeds in certain types of machines.

The reduced unwind effort not only facilitates removing tape from rolls but has the great advantage of reducing the possibility of the tape breaking or tearing, which is of particular importance when the tape backing is a thin, non-fibrous, cellulosic film, such as cellophane or cellulose acetate.

A valuable feature of pressure-sensitive adhesive tapes of the present type is that there is no marked increase in the unwind effort when the rolls are subjected to low temperatures (0° C. and even lower). Pressure-sensitive tape adhesives in general become more aggressively tacky at subnormal temperatures, so that rolls of tape not provided with a low-adhesion backsize become hard to unwind at low temperatures. This undesirable effect is overcome by use of my low-adhesion backsizing.

The foregoing factual statements summarize the results of a large number of experiments wherein a great many polymers were made in order to determine the effect of chain length, ester: acid ratio, etc., in respect to the desired characteristics.

Illustrative products embodying the invention will be described in connection with the accompanying drawing, the products being shown in diagrammatic side or edge views in the various figures.

Fig. 1 shows a roll 10 of pressure-sensitive adhesive tape wound directly upon itself. The tape has a normally tacky and pressure-sensitive adhesive coating on the face side, and a low-adhesion backsize coating on the back side, this backsize coating being of the octadecyl acrylate:acrylic acid copolymer type, or the like, previously described. The tape is wound so that the adhesive side is on the inside. In the roll, the backing serves not only as a permanent base or support for the tacky adhesive coating but also as a temperory liner since, in the latter connection, the backing in each turn of the roll temporarily contacts and covers the adhesive surface of the overlying turn. The limited adhesion between the backsize and the pressure-sensitive adhesive makes it possible to unwind the tape with less effort. Moreover, when the tape is being unwound, there is less pull of the adhesive upon the back surface of the underlying convolution from which it is separated, thereby reducing the force tending to cause delamination of the tape structure and its constituent elements, and tending to cause breaking and tearing of the tape. The degree of adherency is sufficient to hold the wound tape in place and thus prevent spontaneous separation of the turns in the roll, without the need of any holding device (such as is needed in the case of rolls of non-tacky tape), and to permit of efficient use of the tape rolls in the regular hand-operated tape dispensers (such as the dispenser shown in the Borden U. S. reissue patent, Re. 23,129).

Fig. 2 shows a magnified edge view of an illustrative tape having a non-fibrous film backing 11 coated on the face side with a normally tacky and pressure-sensitive adhesive 12 and on the back side with a low-adhesion backsize film 13 of the present type. This tape is not limited to particular non-fibrous film backings nor to particular pressure-sensitive adhesive compositions. The present backsize can be applied by coating from solution or emulsion upon a wide variety of non-fibrous films to which the ultimate dried backsize film will be firmly bonded so as to prevent delamination under the pull of the contacting adhesive when the tape is unwound from rolls. The two tape backing films in most common commercial use are normal cellophane (non-moistureproofed regenerated cellulose films softened with glycerine) and plasticized cellulose acetate films, and extensive experiments have demonstrated the usefulness of the present backsize for each of them. Other cellulosic films are illustrated by those made of ethyl cellulose, benzyl cellulose, cellulose butyrate, cellulose aceto-butyrate, cellulose nitrate, etc. A suitable glassine paper can be used. Examples of non-cellulosic films are the various vinyl polymer films such as those made from polyvinyl alcohol, polyvinyl acetate, copolymers of vinyl acetate and vinyl chloride, polyvinyl butyral, polyvinylidene chloride, etc. Various other backing films are known to those skilled in the art.

The adhesive can be any of the normally tacky adhesives employed in making pressure-sensitive tapes, as my low-adhesion backsize coatings have a general effectiveness. These water-insoluble rubbery base or rubber-resin type adhesives, commonly have a natural or synthetic rubber base which provides cohesion (internal strength) and elasticity (a retractive force when stretched and retraction when released after stretching); and which is modified in a way which increases adhesion (tackiness) and decreases cohesion, with an attendant modification of stretchiness (elongation under low stresses) and elasticity; thereby resulting in an adhesive having a proper four-fold balance of adhesion, cohesion, stretchiness and elasticity. It is this four-fold balance which permits pressure-sensitive tapes to be aggressively and stably tacky and yet be capable of being stripped back from smooth non-fibrous surfaces to which temporarily applied (such as those of plate glass, metal sheets and packaging films) without delamination or offsetting of adhesive, even though the adhesive is coated upon at glassy-surfaced non-porous film backing having approximately the same adhesion value toward it. The modification of the rubbery base of the adhesive is commonly effected by blending a compatible tackifier resin (such as ester gum) in proportion to secure the desired combination of tacky and non-offsetting properties. Other illustrative tackifier resins in common use are pure hydrocarbon terpene resins (such as "Piccolyte" resin), and hydrogenated indenecoumarone resins (such as "Nevillite" resin). The proportion of tackifier resin is generally in the range of 50 to 100 parts by weight per 100 parts of the rubber base, for making aggressively tacky tapes. It is possible to use certain synthetic polymer compositions which are inherently normally tacky and pressure-sensitive and possess the above-mentioned four-fold balance of properties, such as a 75:25 copolymer of 2-ethylbutyl acrylate and ethyl acrylate, and hence these are classed in the art as being of the rubber-resin type.

These adhesives are termed "eucohesive" by which it is meant that they are more cohesive than adhesive such that offsetting or transfer of adhesive material does not result when a sheet or tape coated therewith is unwound from rolls or removed from surfaces to which temporarily applied, and can be handled without transfer of adhesive material to the fingers.

The extreme thinness of the low-adhesion backsize film (e. g. $10^{-5}$ in.) makes for tenacious bonding and resistance to separation from the backing film, and prevents it from cracking, rupturing or flaking when the tape is bent at a sharp angle or creased. Maximum flexibility, transparency and inconspicuousness are also insured.

A feature of the present backsize is that it is hydrophobic (water-repellent) and provides a waterproof back surface. This is of particular value when the backing film is normal (non-moistureproofed) cellophane, or the like, which is permeable to water and quickly becomes soft and weak when in contact with water. The backsize does not greatly change the moisture-vapor permeability of the cellophane.

The adhesive tape may be of the uncolored transparent type, to provide an "invisible" mending, sealing and holding tape, employed for mending books, records, maps and charts, for sealing transparent package wrappers and bags, for removably fastening posters and notices on glass windows and bulletin boards and on school blackboards, etc. Or the tape may be a decorative type of tape, transparent or opaque, made by including coloring material (dye or pigment) in the backing film or the adhesive or both, or by printing the backing film, as is well known in the art. Colored tapes are widely used for sealing and decorating gift packages, and as coding tapes for identifying wires, tubes and pipes in complex assemblies. These pressure-sensitive adhesive tapes seal instantly on contact with most surfaces, and do not require moistening or heating.

Fig. 3 shows a magnified edge view of an illustrative tape having a non-fibrous film backing 14 provided with a low-adhesion backsize film 15. The face side of the backing is coated with a thin primer film 16 upon which is coated a pressure-sensitive adhesive layer 17. The structure is the same as that of Fig. 2 except for the presence of the inside primer film, which serves to bond the adhesive layer to the face side of the backing film more firmly than would be the case if the primer were omitted. Thus a still further increase in adhesion differential results in respect to the adhesion of the pressure-sensitive adhesive to the surface upon which it is coated as compared to its adhesion to the back surface of the tape when wound in a roll. The inside primer also has value in providing an extra margin of safety against adhesive offsetting when the tape is removed from other surfaces to which applied (as when the tape is used to hold a poster on a store window).

The inside primer should be of a kind which is highly cohesive, which strongly anchors to the backing film, and which has greater adhesion to the pressure-sensitive adhesive than would the inner backing film surface. When normal cellophane is used as the backing film, it has been common to employ a two-phase primer film which is the dried deposition product of a coating of an aqueous mixed dispersion of latex rubber (natural or synthetic) and a hydrophilic colloidal agglutinant (such as casein or polyvinyl alcohol)—cf. U. S. Patents Nos. 2,323,057 and 2,328,066.

Fig. 4 shows a magnified edge view of a pressure-sensitive adhesive tape having a fibrous paper backing 18 coated with a pressure-sensitive adhesive 19 upon the face side. The fibrous back side of the paper has a coating of a surface filler sizing 20 which coats the fibers and fills the interstices so as to provide a comparatively smooth and non-absorbent back surface upon which in turn is coated the low-adhesion backsize film 21. The primary reason for employing the intermediate sizing 20 is to reduce the amount of the low-adhesion copolymer needed for filming the back surface of the tape, and it may be omitted if desired.

The fibrous paper types of backings, such as are employed in masking tapes, are customarily unified by pre-impregnation with a material adapted to bind the fibers together so as to prevent splitting or delamination of the paper under the strong force exerted upon the paper when aggressively tacky tape is unwound from rolls thereof (cf. U. S. Patents Nos. Re. 19,128 and 2,236,527). The impregnant material provides a surface filler coating upon which the low-adhesion coating can be applied. By using a low-adhesion backsize in accordance with this invention, the tape roll unwinding force is reduced so substantially that a less strongly unified paper backing can be employed. In fact the need for impregnation of the paper can be entirely eliminated, as by using a fairly thin and dense type of highly calendered paper. Thus the cost of paper-backed pressure-sensitive tapes, suitable for some purposes, can be greatly reduced. The paper can be flat or creped, creped paper being used for most masking tapes. Parchmentized paper can be employed.

The filler sizing 20 can be, for example, a coating of glue or casein (which may be insolubilized in situ with formaldehyde), or a cellulose derivative (such as ethyl cellulose or cellulose acetate), or an alkyd resin. It also has value for binding the surface fibers and for waterproofing the paper. The backsize coating firmly anchors to such sizings.

This principle may also be applied to other fibrous tape backings, such as felted and woven backings made from textile fibers. These may be sized on the back so as to bind the fibers and reduce the amount of the low-adhesion backsize material which is needed.

Fig. 5 shows a tape roll 22 formed of an adhesive tape 23 which is coated on both sides with a pressure-sensitive adhesive, and is laminated to a removable liner 24 of paper (flat or creped) or cloth which is coated on both sides with a low-adhesion coating of the present type. The liner is thus interwound with the adhesive tape, and the latter is located in the roll between turns of the liner which prevents adjacent turns of the tacky tape from bonding together. The tape and liner are wound in so that the liner is on the outside. When drawn from the roll, the liner can be readily separated due to the low adherency. The low adherency reduces the unwinding effort. The use of inexpensive paper for the liner is feasible because of the reduced tendency to split and break. The liner paper should preferably be given a surface filler sizing before application of the low-adhesion coating, as explained in connection with Fig. 4. An illustrative double-coated pressure-sensitive adhesive tape is described in U. S. Patent No. 2,206,899.

Fig. 6 shows a further illustrative use of low-adhesion liners. The liner sheet 25 (which may be a non-fibrous film, or paper or cloth) is provided with a low-adhesion surface coating 26. Mounted on this low-adhesion surface of the liner are a plurality of pressure-sensitive adhesive labels 27, each of which has an integral tacky adhesive coating 28 by which it is detachably adhered to the liner. The labels are thus conveniently held in position with the tacky adhesive surface covered and protected by the liner. When it is desired to remove the label for use, the low-adhesion surface of the liner permits of easy separation, which may be facilitated by curving or flexing the liner. Small labels, such as price labels, can be mounted in large numbers upon a single sheet or strip in this way. Sheets of such labels can be stacked so that a large number of the labels can be stored or carried in a small container without danger of the labels becoming stuck together, and each label is conveniently held in position for removal and use whenever desired. Price labels of this type have the advantage over gummed labels (which require moistening) that they firmly adhere to smooth surfaces and yet can be readily peeled off after a sale has been made, and they require no moistening. Hence they can be used to great advantage on glassware, pottery, silverware, watches, shoes, etc.

Such low-adhesion liners can also be employed to advantage for supporting and protecting tacky bandages and corn plasters, for example.

Milled rubber and latex rubber have adherent surfaces which cause sheets or coatings thereof to cohere when brought together. It is often desired to roll or stack such sheets, or sheet materials having coatings thereof, and where this would result in a sticking or bonding together of the rubber surfaces thus brought into mutual contact, a low-adhesion liner (coated on both sides with low-adhesion coatings) may be employed to advantage as a temporary protective covering, serving to separate the surfaces.

From the foregoing description it will be evident that the term "liner," as broadly used in the claims, includes not only the types of liners just described, but also sheet materials in general which have a low-adhesion surface sizing or coating, including the backings of adhesive tapes (since the latter function in part as liners when the tape is wound in rolls or stacked in sheets). The term "adherent rubber surfaces" is broadly used in reference not only to rubbery base pressure-sensitive adhesives, but also to other rubbery materials which stick or cohere together, even though having little or no adhesion tack towards dissimilar surfaces.

*Preparation of the copolymers*

The higher-alkyl acrylate monomeric starting compounds can be made by direct esterification of acrylic acid with the corresponding higher-alkyl alcohols. Thus the octadecyl acrylate ester ($CH_2:CHCOOC_{18}H_{37}$) can be made from acrylic acid and octadecyl alcohol. The higher-alkyl methacrylate esters can be similarly prepared from methacrylic acid and the corresponding alcohols. Mixtures of alcohols can be used as, for example, stenol, a mixture of higher alcohols containing octadecyl alcohol in major proportion. The esters can be suitably purified by vacuum distillation.

The acrylate or methacrylate ester monomer (or mixtures thereof) and the acrylic or methacrylic acid monomer (or mixtures thereof) can be readily copolymerized in solution in the presence of a benzoyl peroxide type of catalyst, at temperatures in the range of about 50 to 70° C., to obtain a substantially 100% conversion of the monomers to the copolymer product. Ethyl acetate and methylethyl ketone are very satisfactory solvents.

The following specific example of a suitable procedure illustrates the preparation of an octadecyl acrylate:acrylic acid copolymer having an ester:acid ratio of 3:2 by weight.

The polymerization vessel is provided with means for heating and cooling, and with a stirrer, reflux condenser and thermometer. It is charged with 21 parts by weight of octadecyl acrylate and 14 parts of acrylic acid dissolved in 65 parts of ethyl acetate (solvent). Oxygen is removed by bubbling nitrogen through the batch for at least one hour. Then 0.175 part of benzoyl peroxide is added. The temperature is held at 50° C. As heat is evolved by the polymerization reaction, less heating is needed to maintain the temperature, and sometimes it may be necessary to resort to cooling to hold the temperature. Coincidentally, a gradual increase in viscosity will be noted. A determination of the solids content can be made every hour to determine the extent of polymerization. When the solids content has reached 25%, usually about four hours after the onset of polymerization, the temperature is raised to 70° C. to increase the rate.

When the solids content reaches 34.5 to 35.1%, after about two hours of continued reaction at 70° C., the polymerization is considered to be complete. At this stage the viscosity of the solution is quite high and it is advisable to thin with toluene to a 25% solids content. To prevent gelation, 2% of water (relative to total solvent) can be added. The solution is then ready for transfer to storage containers. For most coating operations a still lower viscosity is desirable and can be obtained by further thinning with toluene to a 5 or 10% solids content, as desired.

A water-dispersed copolymer can easily be made. The use of an aqueous dispersion has advantages for coating purposes in that there is a saving in cost of solvent and fire hazards are avoided.

The following illustrates a suitable procedure for making water dispersions of the copolymer: To 200 parts by weight of the copolymer solution in ethyl acetate there is added, with vigorous stirring, 130 parts of isopropanol (isopropyl alcohol) and then 620 parts of hot water, followed by 12 parts of morpholine. The organic solvents are distilled off under vacuum until 330 parts of distillate has been removed. The remaining water dispersion is fluid and translucent, with a solids content of about 11% and a pH value of 5.0 to 6.0. It is of suitable viscosity for coating purposes, but can be thinned as desired by stirring in additional water.

Cellophane sheeting of the normal, non-moistureproofed type, is commonly employed in making film-backed tapes. Although highly moisture-sensitive, it can be coated with the aqueous dispersion of the copolymer to obtain, upon drying, a smooth, unwrinkled coated sheet, by employing the technique used in the tape art for priming cellophane with aqueous casein/latex dispersions (cf. U. S. Patent No. 2,328,066). The procedure is to coat the cellophane sheeting by passing it between a pair of horizontal squeeze rolls, the lower of which is rubber-covered and dips into a bath of the aqueous dispersion. The rolls are set to squeeze out excess liquid and obtain the desired coating weight. The wet, coated cellophane sheeting then passes around one or more steam-heated drying drums, coated side out, which flash-dry the coating in a few seconds, and proceeds to a wind-up roll or to further coating equipment. The temperature of the drying drums should be such that the copolymer coating is not heated sufficiently to become tacky. The tension on the cellophane web, as it is drawn through the coating and drying equipment, coupled with the fact that it is held flat by the squeeze rolls and steam drums, and that the time interval between coating and drying is short, makes for a smooth, unwrinkled product.

When the cellophane is to be primed on the face side (so as to underlie the ultimate adhesive coating), the priming operation can be performed before or after the backsizing operation.

The cellophane sheeting, backsized with the low-adhesion copolymer, can then be coated with a solution of the pressure-sensitive adhesive on the face side, followed by drying to remove the solvent, and it is then ready for slitting and winding into rolls of tape.

Having described various embodiments of my invention for the purposes of illustration rather than limitation, what I claim is as follows:

1. A non-fibrous cellulosic film having an exposed low-adhesion surface coating directly bonded thereto whose thickness does not exceed the order of a hundred-thousandth of an inch and which is formed of a copolymer of an ester of the class consisting of higher-alkyl acrylates and methacrylates wherein the higher-alkyl radical has a length of at least 12 carbon atoms, and an acid of the class consisting of acrylic acid and methacrylic acid, the ester component of the copolymer being in the proportion of about 40 to 80 percent by weight.

2. A coated cellulosic film according to claim 1, wherein said ester is an acrylate having an alkyl radical 16 to 20 carbon atoms in length, and said acid is acrylic acid.

3. A non-fibrous cellulosic film having an exposed low-adhesion surface coating directly bonded thereto whose thickness does not exceed the order of a hundred-thousandth of an inch and which is formed of the copolymer of octadecyl acrylate and acrylic acid, having an ester:acid ratio of about 3:2 by weight.

4. In combination with an article having an adherent rubber surface, a removable liner having a thin low-adhesion surface coating in contact with said adherent rubber surface, said low-adhesion liner coating being formed of a copolymer of an ester of the class consisting of higher-alkyl acrylates and methacrylates wherein the higher-alkyl radical has a length of at least 12 carbon atoms, and an acid of the class consisting of acrylic acid and methacrylic acid, the ester component of the copolymer being in the proportion of about 40 to 80 percent by weight.

5. In combination with a pressure-sensitive adhesive coating, a removable liner having a low-adhesion coating in contact with said adhesive coating, said low-adhesion liner coating being formed of a copolymer of an ester of the class consisting of higher-alkyl acrylates and methacrylates wherein the higher-alkyl radical has a length of 16 to 20 carbon atoms, and an acid of the class consisting of acrylic acid and methacrylic acid, the ester component of the copolymer being in the proportion of about 40 to 70 percent by weight.

6. A normally tacky and pressure-sensitive adhesive tape characterized by having a low-adhesion backsize coating formed of a copolymer of an ester of the class consisting of higher-alkyl acrylates and methacrylates wherein the higher-alkyl radical has a length of at least 12 carbon atoms, and an acid of the class consisting of acrylic acid and methacrylic acid, the ester component of the copolymer being in the proportion of about 40 to 80 percent by weight.

7. A pressure-sensitive adhesive tape wound upon itself in roll form, having a flexible backing coated on the inner face with a normally tacky rubber-resin type pressure-sensitive adhesive and basksized with a thin low-adhesion coating formed of a copolymer of an ester of the class consisting of higher-alkyl acrylates and methacrylates wherein the higher-alkyl radical has a length of 16 to 20 carbon atoms, and an acid of the class consisting of acrylic acid and methacrylic acid, the ester component of the copolymer being in the proportion of about 40 to 80 percent by weight.

8. A pressure-sensitive adhesive tape wound upon itself in roll form and comprising a non-fibrous cellulosic film backing, a normally tacky rubber-resin type pressure-sensitive adhesive coating firmly united to the inner face of the backing film, and a microscopically thin low-adhesion backsize coating firmly united to the outer face of the backing film and formed of a copolymer of an ester of the class consisting of higher-alkyl acrylates and methacrylates wherein the higher-alkyl radical has a length of at least 12 carbon atoms, and an acid of the class consisting of acrylic acid and methacrylic acid, the ester component of the copolymer being in the proportion of about 40 to 70 percent by weight; the tacky adhesive being inactive to the low-adhesion backsize to a degree permitting easy unwinding of the tape without delamination or breaking and without offsetting of adhesive.

9. An adhesive tape according to claim 8, wherein said higher-alkyl radical has a length of 16 to 20 carbon atoms.

10. A pressure-sensitive adhesive tape wound upon itself in roll form and comprising a transparent non-fibrous cellulosic film backing coated on the inner face with a normally tacky rubber-resin type pressure-sensitive adhesive and coated on the outer face with a low-adhesion backsize whose thickness does not exceed the order of a hundred-thousandsth of an inch and which is formed of the copolymer of octadecyl acrylate and acrylic acid, having an ester:acid ratio of about 3:2 by weight.

11. A pressure-sensitive adhesive tape wound upon itself in roll form and comprising a paper backing, a normally tacky rubber-resin type pressure-sensitive adhesive coating firmly united to the inner face of the backing, and a thin low-adhesion backsize coating firmly united to the outer face of the backing and formed of a copolymer of an ester of the class consisting of higher-alkyl acrylates and methacrylates wherein the higher-alkyl radical has a length of at least 12 carbon atoms, and an acid of the class consisting of acrylic acid and methacrylic acid, the ester component of the copolymer being in the proportion of about 40 to 70 percent by weight; the tacky adhesive being inactive to the low-adhesion backsize to a degree permitting easy unwinding of the tape without delamination or breaking and without offsetting of adhesive.

12. An adhesive tape according to claim 11, wherein said higher-alkyl radical has a length of 16 to 20 carbon atoms.

13. An adhesive tape according to claim 11, wherein said copolymer is the copolymer of octadecyl acrylate and acrylic acid, having an ester:acid ratio of about 3:2 by weight.

JAMES O. HENDRICKS.

REFERENCES CITED

The following references are of record in the file of this patent:

UNITED STATES PATENTS

| Number | Name | Date |
|---|---|---|
| 2,391,181 | Minsk et al. | Dec. 18, 1945 |
| 2,410,089 | Lundquist | Oct. 29, 1946 |
| 2,438,195 | Tierney | Mar. 23, 1948 |
| 2,464,826 | Neher et al. | Mar. 22, 1949 |
| 2,473,544 | Rehberg et al. | June 21, 1949 |
| 2,496,349 | Kellgren et al. | Feb. 7, 1950 |
| 2,532,011 | Dahlquist et al. | Nov. 28, 1950 |